United States Patent [19]

Lindee

[11] Patent Number: 4,928,591
[45] Date of Patent: May 29, 1990

[54] MOLDING MECHANISM FOR ROD-SHAPED FOOD PRODUCT

[75] Inventor: Scott A. Lindee, New Lenox, Ill.

[73] Assignee: Formax, Inc., Mokena, Ill.

[21] Appl. No.: 390,373

[22] Filed: Aug. 7, 1989

[51] Int. Cl.$^5$ ............................................. A22C 7/00
[52] U.S. Cl. ........................................ 99/485; 17/32
[58] Field of Search ................... 99/485; 17/1 F, 32, 17/45; 426/513; 425/542, 556, 344, 352, 354, 572, 588, 236

[56] References Cited

U.S. PATENT DOCUMENTS

| | | | |
|---|---|---|---|
| Re. 30,096 | 9/1979 | Richards | 17/32 |
| 3,005,716 | 10/1961 | Moreland | |
| 3,132,950 | 5/1964 | Macy et al. | 426/513 X |
| 3,319,286 | 5/1967 | Ammons et al. | 17/45 |
| 3,416,187 | 12/1968 | Chartier | 17/32 |
| 3,421,178 | 1/1969 | Ammons et al. | 17/32 |
| 3,724,026 | 4/1973 | Gernandt | 17/32 X |
| 4,054,967 | 10/1977 | Sandberg et al. | 17/32 |
| 4,091,504 | 5/1978 | Wong | 17/32 |
| 4,182,003 | 1/1980 | Lamartino et al. | 17/32 |
| 4,298,327 | 11/1981 | Koppens | 425/344 |
| 4,642,847 | 2/1987 | Ross | 17/1 F |
| 4,726,093 | 2/1988 | Rogers | 17/1 F |
| 4,768,260 | 9/1988 | Sandberg | 17/32 |
| 4,872,241 | 10/1989 | Lindee | 17/32 |

Primary Examiner—Harvey C. Hornsby
Assistant Examiner—Scott J. Haugland
Attorney, Agent, or Firm—Kinzer, Plyer, Dorn, McEachran & Jambor

[57] ABSTRACT

A food product molding mechanism for producing rod-shaped food products such as sausages, which may be implemented by conversion tooling in a reciprocal mold plate food patty molding machine, comprises an aligned assembly of N mold tubes mounted in alignment with a fill passage that supplies a moldable food product to the mold tubes. The mechanism further includes front and rear drawbars interconnected in fixed spaced relation by guide rods that guide the drawbars for reciprocal movement, along a mold path, between a fill position and a discharge position. N front mold rods project from the front drawbar toward the mold tubes; N rear mold rods project from the rear drawbar into the mold tubes. The spacing between facing ends of the two mold rods for each mold tube is less than the mold tube length. With the mold rod assembly in its fill position both mold rods project into each mold tube and determine the length of the food product; for the discharge position of the mold rod assembly each rear mold rod projects completely through its mold tube and the food products are all displaced completely out of the mold tubes.

27 Claims, 4 Drawing Sheets

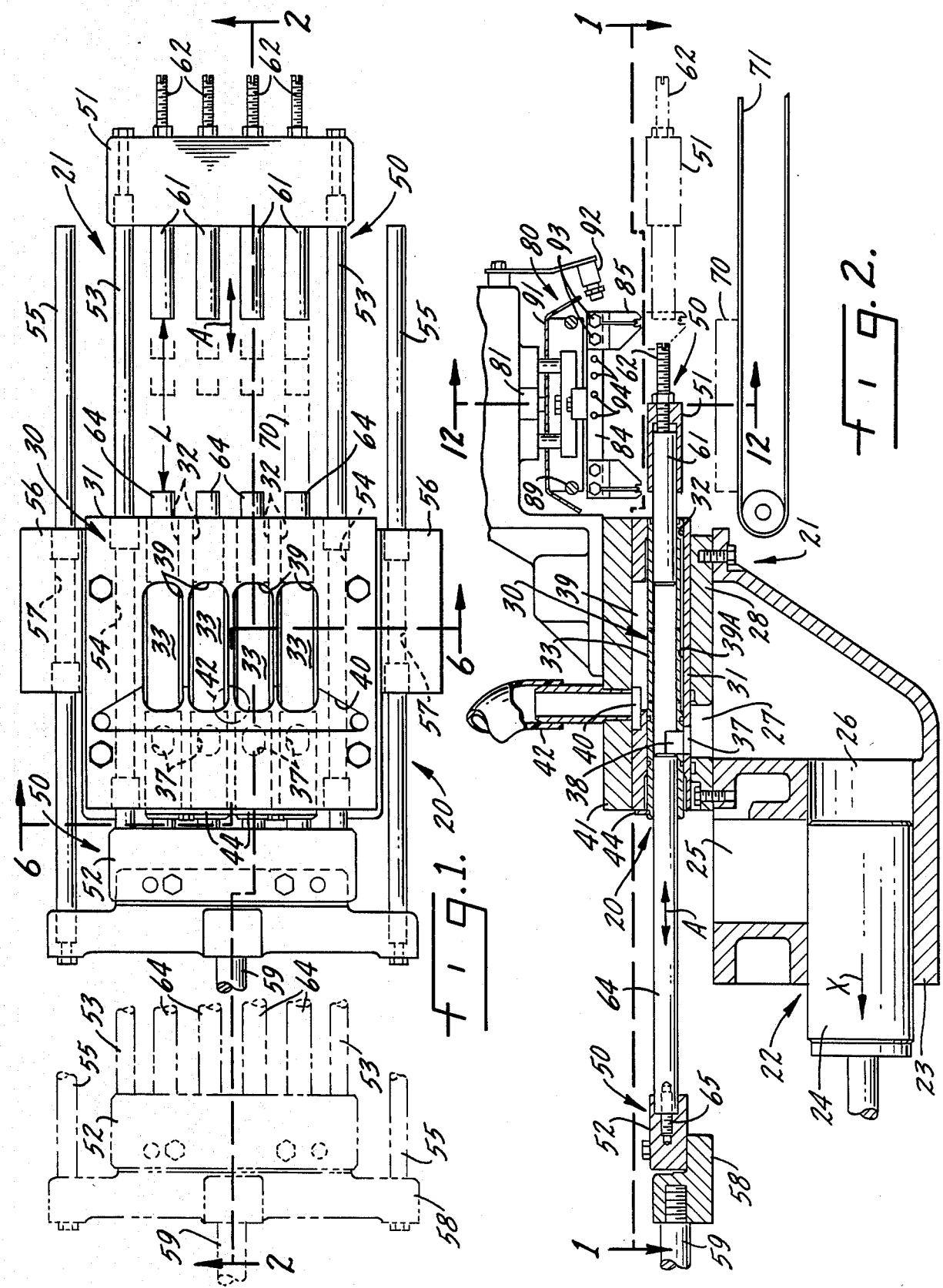

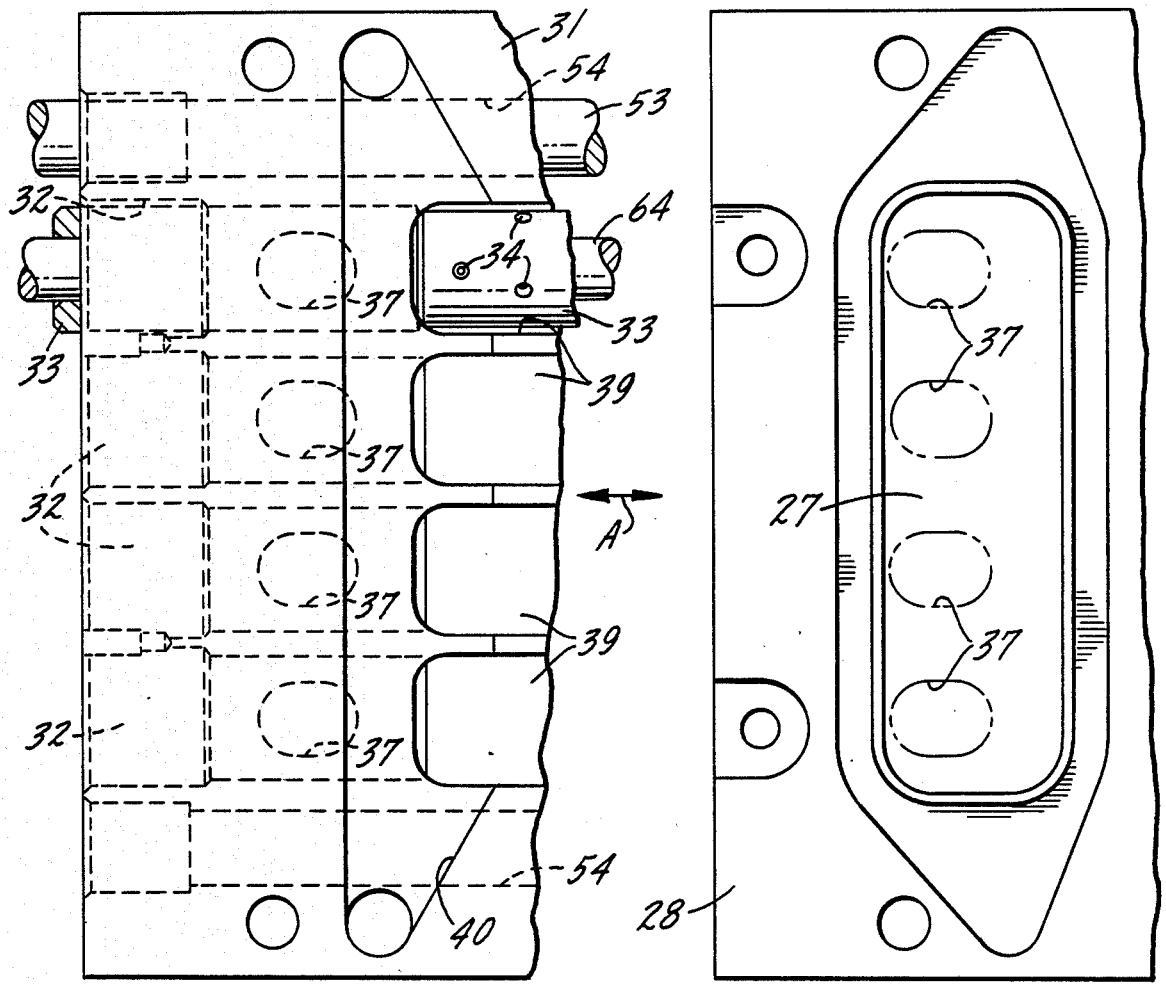

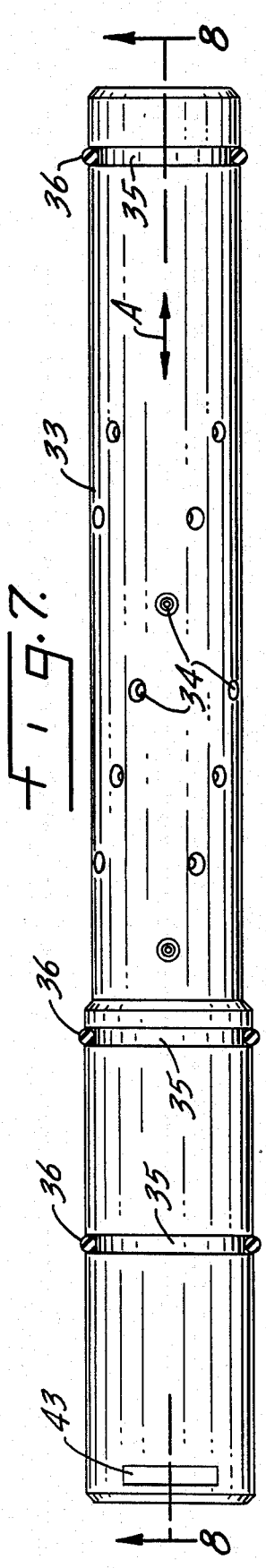
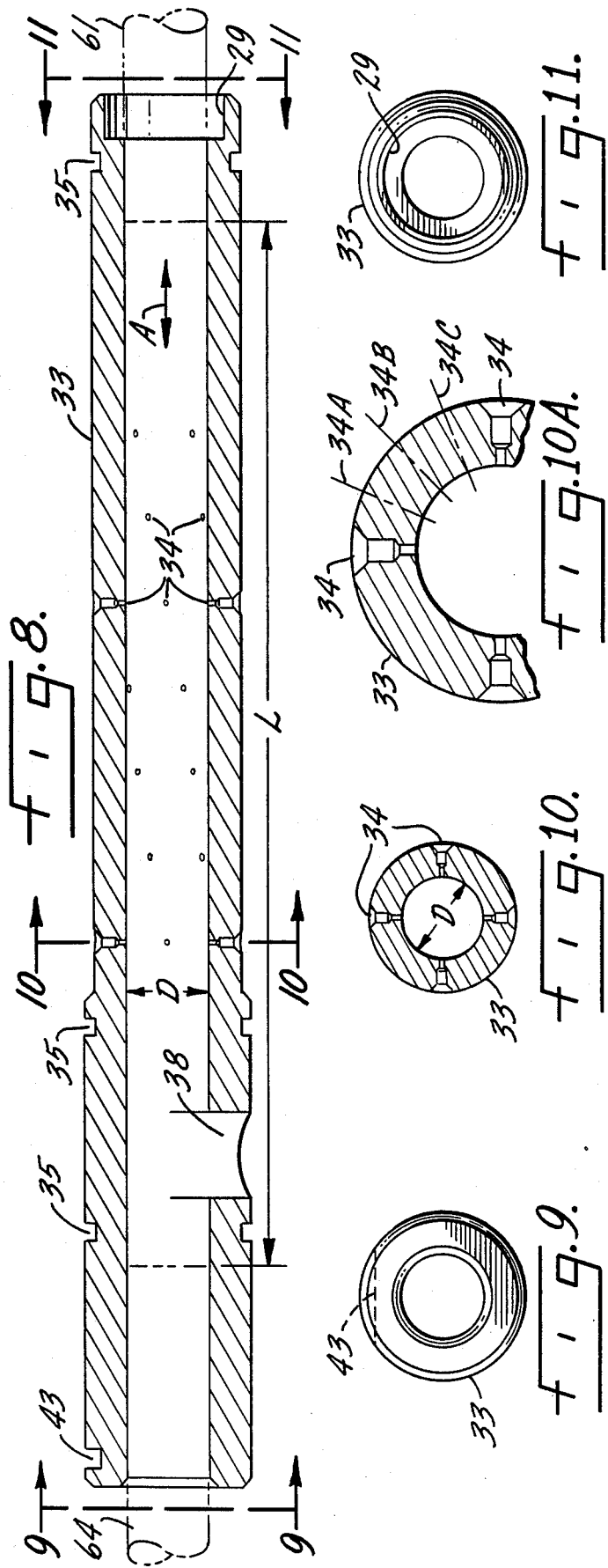

MOLDING MECHANISM FOR ROD-SHAPED FOOD PRODUCT

BACKGROUND OF THE INVENTION

Over a substantial period of time, food molding machines that utilize reciprocating mold plates have proved quite versatile and economical in operation. Machines of this sort that have been successful commercially are described in detail in a series of United States patents, particularly Reissue Nos. Re. 30,096, 4,054,967, 4,182,003, and 4,768,260. By changing the tooling in the mold stations in these machines, all are readily adapted to the production of ground meat patties in a wide variety of varying dimensions and weights. With other tooling in the same mold stations, these machines can economically and effectively produce food products from chopped meat, from shredded meat, from fish, and from a variety of other food materials. Indeed, in the production of some poultry products the meat is not even cut up to any appreciable extent before being fed into the machines; the pressures that these machines develop are sufficient to permit the machines to work with whole chunks of some meats, poultry, fish, and other food materials.

On occasion, reciprocal mold plate food patty molding machines have been adapted to the production of elongated rod-shaped food products such as sausages. Generally speaking, however, these endeavors have not been particularly successful. The mold plate for a machine of this kind can be formed with a series of narrow, elongated cavities simulating the desired rod-like shape, but cavities of this sort present appreciable difficulties with respect to ejection of the molded food products by conventional knockout mechanisms. The food products themselves are not of circular cross-sectional configuration and cannot have that configuration when the machines and mold plates are used in the customary manner. Generally speaking, attempted use of a machine of this kind for the manufacture of a truly rod-shaped molded food product has not been effective from an economic standpoint and has not proved commercially desirable.

In some attempts at conversion of a reciprocating mold plate food product molding machine to the manufacture of rod-shaped food products, the mold plate itself has been replaced by a series of tubes, or by a housing with a plurality of elongated holes, that function as mold cavities. Rods move into and out of these mold tubes, two rods for each tube, in the course of the molding operations. In such machines, the pair of mold rods for each tube/hole usually start the mold filling part of the cycle either in contact or closely adjacent to each other; as the food product is pumped into the mold tube, the rods separate from each other. Ultimately, the rods must be stopped at a spacing determined as the ultimate length of the molded food product. This concept, which has been tried in various forms, introduces undue complexities into the operation of the machine because it is essential to move one or both mold rods of each pair during each mold filling operation, either with a separate drive or in response to the pressure filling of the mold tube. Food product length, diameter, and weight adjustment can be difficult and complex in a machine of this kind, and maintenance problems may be exacerbated. These same machines may also have product quality difficulties due to entrapped air in the mold tubes. Thus, a conversion of this sort, adapting a reciprocating mold plate machine to the production of rod-shaped food products such as sausages, presents appreciable problems.

SUMMARY OF THE INVENTION

It is a primary object of the invention, therefore, to provide a new and improved food product molding mechanism for molding rod-shaped food products that employs the proven, economical, and effective reciprocating mold cycle of a known reciprocating mold plate food patty molding machines in the production of those rod-shaped food products without introducing undue complexity with respect to drives or component movements, in a manner that preserves the simplicity, economy, and other favorable operating features of known reciprocating mold plate machines.

A further object of the invention is to provide new and improved conversion tooling for converting a reciprocal mold plate food patty molding machine to the production of rod-shaped food products such as sausages, which tooling requires no substantial change in the main drive of any part of the patty molding machine and, in fact, allows the patty molding machine to function on its normal operating cycle.

Accordingly, in one aspect the invention relates to a food product molding mechanism for molding rod-shaped food products, comprising food pump means for pumping a moldable food material under pressure into one end of a fill passage, and a mold tube assembly mounted in alignment with the other end of the fill passage, the mold tube assembly including a plurality of N elongated mold tubes each of given length, each mold tube aligned parallel to a predetermined mold path and each mold tube having a fill opening aligned with the fill passage. The mechanism further includes a mold rod assembly comprising a front drawbar, a rear drawbar, guide means, interconnecting the drawbars, for maintaining the drawbars in fixed spaced relation to each other adjacent opposite ends of the mold tube assembly, with each drawbar extending across the mold path, N front mold rods, mounted on the front drawbar, each projecting toward the mold tube assembly parallel to the mold path and in alignment with one of the mold tubes; N rear mold rods, mounted on the rear drawbar, each projecting toward the mold tube assembly parallel to the mold path and into one of the mold tubes; the ends of the front and rear mold rods that are aligned with each mold tube are spaced from each other by a predetermined distance L less than the length of that mold tube. The mechanism also comprises drive means, connected to the mold rod assembly, for cyclically reciprocally driving the mold rod assembly along the mold path between a fill position, in which food material flows from the fill passage into each mold tube between the spaced ends of the mold rods to form a rod-shaped food product in each mold tube, and a discharge position, in which the ends of both sets of mold rods are clear of the front ends of the mold tubes and each rear mold rod fills the interior of its associated mold tube.

In another aspect, the invention relates to conversion tooling for converting a reciprocal mold plate food patty molding machine to production of rod-shaped food products such as sausages; the food patty molding machine includes a food pump for pumping a moldable food material under pressure into a fill passage at a molding station, drive means for cyclically reciprocally driving a mold plate along a mold path, between a fill position at which a mold cavity in the mold plate is aligned with the fill passage to receive food material and form a food patty, and a discharge position in which the mold cavity is clear of the fill passage, and a knockout mechanism, aligned with the discharge position, actuated in synchronism with the drive means.

The conversion tooling comprises a mold tube assembly mountable in the food patty molding machine in alignment with the fill passage, the mold tube assembly including a plurality of N elongated mold tubes each of given length, each mold tube aligned parallel to the mold path and each mold tube having a fill opening aligned with the fill passage. The conversion tooling further includes a mold rod assembly comprising, a front drawbar, a rear drawbar, guide means for interconnecting the drawbars and maintaining the drawbars in fixed spaced relation to each other adjacent opposite ends of the mold tube assembly, with each drawbar extending across the mold path, N front mold rods, mounted on the front drawbar, each projecting toward the mold tube assembly parallel to the mold path and in alignment with one of the mold tubes, and N rear mold rods, mounted on the rear drawbar, each projecting toward the mold tube assembly parallel to the mold path and into one of the mold tubes; the ends of the front and rear mold rods that are aligned with each mold tube are spaced from each other by a predetermined distance less than the length of that mold tube. The conversion tooling further comprises connection means for connecting the mold rod assembly to the drive means so that the drive means cyclically reciprocally drives the mold rod assembly along the mold path between a fill position, in which food material flows from the fill passage into each mold tube between the spaced ends of the mold rods to form a rod-shaped food product in each mold tube, and a discharge position, in which the ends of both sets of mold rods are clear of the front end of the mold tubes and each rear mold rod fills the interior of its associated mold tube.

BRIEF DESCRIPTION OF THE DRAWINGS

FIG. 1 is a plan view, taken approximately as indicated by line 1—1 in FIG. 2, of a molding station in a reciprocal mold plate food patty molding machine that incorporates conversion tooling for producing rod-shaped food products, such as sausages, according to one embodiment of the present invention;

FIG. 2 is a sectional elevation view, taken approximately along line 2—2 in FIG. 1, of the molding station of FIG. 1 with the mold rod assembly in fill position;

FIG. 3 is a detail plan view, on an enlarged scale, of a part of the mold tube assembly of FIG. 1;

FIG. 4 is a detail plan view, on an enlarged scale, of the upper end of a fill passage in the apparatus of FIGS. 1 and 2;

FIG. 5 is a sectional elevation view of a mold tube housing that is a part of the mold tube assembly, with one mold tube shown in phantom;

FIG. 6 is a sectional elevation view, on an enlarged scale, of the mold tube assembly, taken approximately as indicated by line 6—6 in FIG. 1;

FIG. 7 is a plan view, on a further enlarged scale, of a mold tube used in the mold tube assembly of FIGS. 1 and 2;

FIG. 8 is a sectional elevation view taken approximately as indicated by line 8—8 in FIG. 7;

FIGS. 9, 10 and 11 are detail views taken approximately as indicated by lines 9—9, 10—10 and 11—11 in FIG. 8;

FIG. 10A is an enlarged illustration corresponding to a segment of FIG. 10;

DESCRIPTION OF THE PREFERRED EMBODIMENTS

Figure 12:
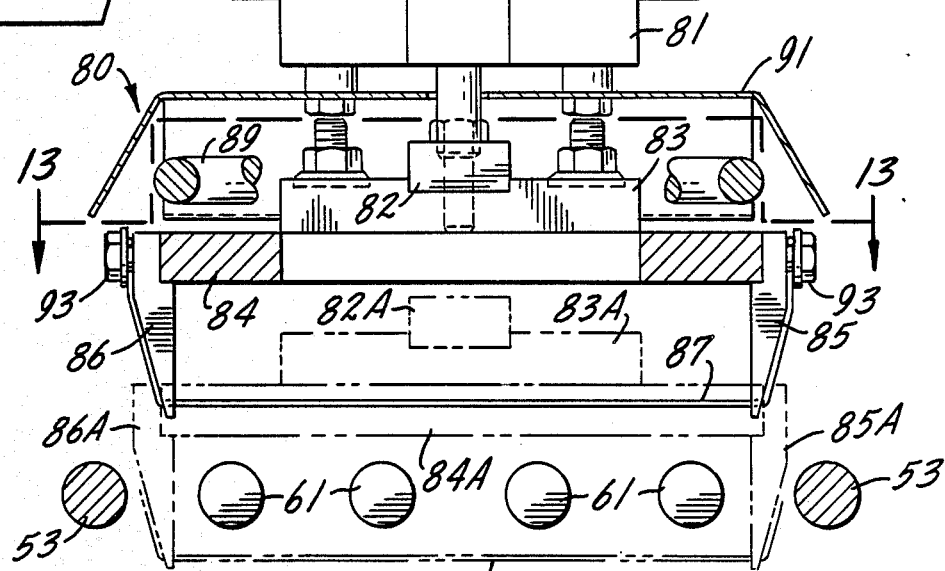
FIG. 12 is a sectional elevation view, on an enlarged scale, of a knockout mechanism, taken approximately as indicated by line 12—12 in FIG. 2.

FIGS. 1 and 2 afford a composite illustration of conversion tooling 20, according to one embodiment of the present invention, for conversion of a reciprocal mold plate food patty molding machine to the production of sausages or other rod-shaped food products. In considering FIGS. 1 and 2, it may be assumed that the basic patty molding machine may correspond to that described and claimed in U.S. Pat. No. 4,768,260. On the other hand, conversion tooling 20 is equally applicable to other reciprocal mold plate food patty molding machines, such as those shown in U.S. Pat. Nos. 4,054,967, 4,182,003, and reissue No. Re. 30,096. As shown in FIGS. 1 and 2, conversion tooling 20 is used in a patty molding machine that feeds a food product into the molding station of the machine from below. However, it should be recognized that conversion tooling 20 is equally applicable to a reciprocable food patty molding machine in which the moldable food product is fed into the molding station from above. As illustrated in FIGS. 1 and 2, it may also be considered that conversion tooling 20 is illustrative of the molding station of a complete food patty molding machine or mechanism 21 comprising one of the preferred embodiments of the present invention.

Molding mechanism 21 (tooling 20) includes a food pump 22 (FIG. 2) comprising a pump housing 23, a piston 24, a food material inlet 25 connecting a supply of a moldable food material (not shown) with a pump chamber 26, and a fill passage 27 that extends from chamber 26 upwardly through a fill plate 28 covering a part of housing 23. In operation, food pump 22 receives a moldable food material, such as sausage, in its inlet 25; that food material is admitted to pump chamber 26 on the withdrawal stroke of piston 24, arrow X. Subsequently, piston 24 is driven into chamber 26, opposite arrow X, to pump the moldable food material under pressure into the lower end of fill passage 27. See FIGS. 2, 4 and 6. This portion of the molding mechanism 21 is shown in the form that it appears in U.S. Pat. No. 4,768,260, but could be replaced by similar portions of the molding mechanisms of other reciprocal food patty molding machines, such as those identified above.

Conversion tooling 20, and hence molding mechanism 21, include a mold tube assembly 30 shown, in whole or in part, in FIGS. 1, 2, 3 and 6. Mold tube assembly 30 comprises a manifold or housing 31, preferably formed of aluminum or stainless steel, that has a plurality of N axial openings 32 for receiving mold tubes. Unless otherwise indicated, all parts of tooling 20 should preferably be of stainless steel, to meet requirements for food processing machinery. In mechanism 21

N=4; in a larger machine there would likely be a larger number of mold tube openings (and mold tubes). As best shown in FIG. 1, the axial openings 32 through manifold housing 31 are parallel to the mold path of molding mechanism 21, indicated generally by arrows A in various views of tooling 20 and its components.

Mold tube assembly 30 further comprises four elongated mold tubes 33, which appear in FIGS. 1, 2 and 6-11. The position of one of the mold tubes 33 in one mold tube aperture 32 in manifold housing 31 is shown in FIG. 5. As best shown in FIGS. 7, 8, 10 and 10A, each mold tube 33 includes a multiplicity of breather vents, the small holes 34. Vents 34 are distributed throughout the central portion of each mold tube 33 and are also distributed around the periphery of the mold tube, as indicated by vent axes 34A–34C, FIG. 10A. Vents 34 are small enough so that most food particles, in the food material, will not pass through them. Each mold tube 33 is also provided with three encompassing O-ring grooves 35, as shown in FIG. 8. O-ring seals 36 are mounted in these grooves 35, as best shown in FIG. 7, so that each mold tube can be effectively hermetically sealed into one of the axial openings 32 in manifold 31, FIGS. 5 and 6. The outlet end of each mold tube 33, the right hand end as seen in FIG. 8, may have a distinct enlarged step recess as indicated at 29 in FIGS. 8 and 11 or may simply be squared off without a recess; an angled configuration is not desirable.

The bottom of manifold housing 31 has a series of fill passage extension holes 37 cut through it, as indicated in FIGS. 1-3, 5 and 6. Each fill passage extension 37 is aligned with the main fill passage 27 that is a part of food pump 22, as best shown in FIGS. 2, 4 and 6. Each mold tube 33, on the other hand, has a fill opening 38, aligned with one of the fill passage extensions 37 when the mold tube is mounted in the manifold (see FIGS. 6 and 8). Accurate orientation of each mold tube in manifold housing 31 can be readily provided by appropriate means such as a slot 43 in the input end of each mold tube (FIGS. 7-9). Slots 43 may be engaged by a bar 44 (FIGS. 1, 2 and 6) to assure the desired alignment.

In the top of manifold 31 of mold tube assembly 30, there are a series of N breather passages 39, one for each mold tube 33, as best shown in FIGS. 1, 3, 5 and 6. In the central portion of manifold housing 31, each mold tube aperture 32 is appreciably larger than the outer diameter of its mold tube 33, so that each breather passage 39 is effectively extended, as at 39A, around the mold tube. See FIGS. 2 and 5. Each breather passage 39, 39A should communicate with vents 34 in a substantial length of the medial portion of its mold tube 33. Each breather passage 39, 39A is in communication with a breather collector groove or passage 40 in the upper surface of manifold 31. A cover plate 41 mounted on top of manifold 31 (FIG. 2) covers most of the breather collector groove 40 and all of the breather openings 39. However, a product return line 42, connected to an opening through cover plate 41, communicates with breather collector 40. Return line 42 is utilized to return those limited quantities of tiny particles of food material that escape through mold tube vent holes 34 into one of the breather passages 39,39A, then into collector 40, and on to the food material supply.

Conversion tooling 20 and, accordingly, molding mechanism 21, further comprises a mold rod assembly 50 that is shown in FIGS. 1, 2 and 6. This mold rod assembly 50 includes a front draw bar 51 and a rear draw bar 52. The two draw bars are interconnected by guide means utilized to maintain the draw bars in fixed spaced relation to each other adjacent opposite ends of the mold tube assembly 30 with each draw bar extending across the mold path (arrows A). This guide means includes two inner guide rods 53 each extending between and connected to both of the two draw bars 51 and 52. Guide rods 53 extend through and are guided by guide apertures 54 in the outer edge portions of manifold 31 parallel to mold path A as shown in FIGS. 1, 3 and 6. The guide means may further be considered to include a pair of outer guide rods 55 that are parallel to guide rods 53. Each rod 55 extends through a guide aperture 57 in a member 56 that is mounted in fixed relation to the mold tube assembly 30; see FIG. 1. Guide rods 55 are both affixed to a yoke 58 on which the rear draw bar 52 is mounted. Yoke 58 is driven by a drive rod 59 from a cyclic drive mechanism (not shown) of the kind used in conventional reciprocating mold plate food patty molding machines, such as those described in the patents identified above. Members 55-59 are usually present in the basic patty molding machine.

Mold rod assembly 50 comprises a set of four front mold rods 61. Each mold rod 61 is affixed to the front draw bar 51 and projects toward one of the mold tubes 33 in a direction parallel to mold path A. There is an axial position adjustment screw 62 for each mold rod 61 in the front set. Each front mold rod 61 should be accurately aligned with its associated mold tube 33 and should be sized with an outer diameter equal to D to fit quite closely within its mold tube. The mold rod assembly 50 also comprises a set of N rear mold rods 64. Rear mold rods 64 are affixed to rear draw bar 52 by retainers 65 and project toward the mold tube assembly 30, each in centered alignment with one of the mold tubes 33, parallel to mold path A. The ends of mold rods 61 and 64 facing toward each other are separated by predetermined lengths L as indicated in FIGS. 1 and 8.

Spacing L is preferably the same for the front and rear mold rods associated with each of the N mold tubes, but can be adjusted to modify the quantity and ensure the exact weight of sausage or other food material desired in the food product made in each mold tube in each stroke of the machine. In the illustrated construction, adjustment of the food product length L is effected by adjustment screws 62, varying the axial positions of the ends of the front mold rods 61 facing mold tubes 33. For the same purpose, rear mold rods 64 could be made axially adjustable, or mold rods of different lengths, front or rear, could be utilized. However, each rear mold rod 64 should always be long enough to project all the way through its associated mold tube when mold rod assembly 50 is in its discharge position, as shown by rods 64 in solid lines in FIG. 1.

The basic operation of conversion tooling 20, molding mechanism 21, in the production of molded rod-shaped food product, can now be considered. As previously noted, food pump 22 maintains a supply of a moldable food material under pressure in fill passage 27, up through fill passage extensions 37 in the bottom of manifold 31. For the fill position for mechanism 21, illustrated in solid lines in FIG. 2 and in phantom in FIG. 1, the opening 38 in each fill tube is aligned with one of the fill passage extensions 37 (FIG. 2) so that the moldable food product flows, under pressure into the interior of each mold tube 33.

The opposite ends of each mold tube 33 are closed by one of the front mold rods 61 and one of the rear mold rods 64, the distance between the ends of the mold rods being the product length L as shown in FIGS. 1 and 8. Thus, the quantity of food material that enters and fills each mold tube is determined by the internal diameter D of the mold tube and by the spacing L between the opposed ends of the front and rear mold rods. Vents 34 provide for escape of air from within each mold tube 33, all around the periphery of each mold tube. The air is forced out through vents 34 (FIGS. 7 and 8), then through the breather "sleeves" 39A and the large breather openings 39 to collector groove 40 and return line 42.

While the mold tubes are being filled, conversion tooling 20 (molding mechanism 21) remains in the fill position shown in solid lines in FIG. 2. When filling is completed, however, the reciprocating mold drive connected to drive rod 59 and yoke 58 drives mold rod assembly 50 from its fill position, illustrated in phantom lines in FIG. 1, to the discharge position shown in solid lines in FIG. 1 and in phantom lines in FIG. 2. During this movement, both sets of mold rods 61 and 64 move conjointly, since drawbar 52 is connected directly to yoke 58 and drawbar 51 is effectively connected to the yoke through guide rods 53 and drawbar 52. That is, spacing L remains constant throughout the cyclic movement of mold rod assembly from its fill position to its discharge position and back again.

When mold rod assembly 50 reaches its discharge position, FIG. 1, there is a rod-shaped molded food product 70 suspended between the facing ends of each pair of mold rods 61,64 in the mechanism. The molded food products 70 are dislodged from the mold rods and deposited upon a takeaway conveyor 71 by a knockout mechanism 80. At this point in the machine cycle, the drive connected to rod 59 reverses and pulls yoke 58 back to its fill position. In this manner, mold tube assembly 50 of conversion tooling 20 is returned to the fill position shown in FIG. 2 and a new fill cycle begins.

In its production of rod-shaped molded food products, mechanism 21 does not vary the positions of mold rods 61 relative to the positions of mold rods 64 at any point in the operating cycle. This is quite advantageous in avoiding complexity of the drive mechanism and its controls, and also contributes to longevity of tooling 20. However, the size and weight of the rod-shaped food products, typically sausages, can be adjusted to suit the requirements of virtually any customer Adjustment screws 62 readily adjust the overall length L of the product. For other major changes in product weight, mold tubes 33 can be quickly replaced by tubes having larger or smaller internal diameters D. Thus, it is a simple matter to change the volume and weight of the molded rod-shaped food products to suit virtually any requirements. Indeed, even the cross-sectional configuration can be modified, so long as mold rods 61 and 64 have shapes conforming to the internal configuration of their associated mold tubes 33. That is, the rod-shaped food products can be of circular cross-sectional shape, as in the illustrated tooling and molding mechanism, but they may also be rectangular, triangular, or virtually any other cross-sectional configuration.

Figure 13:
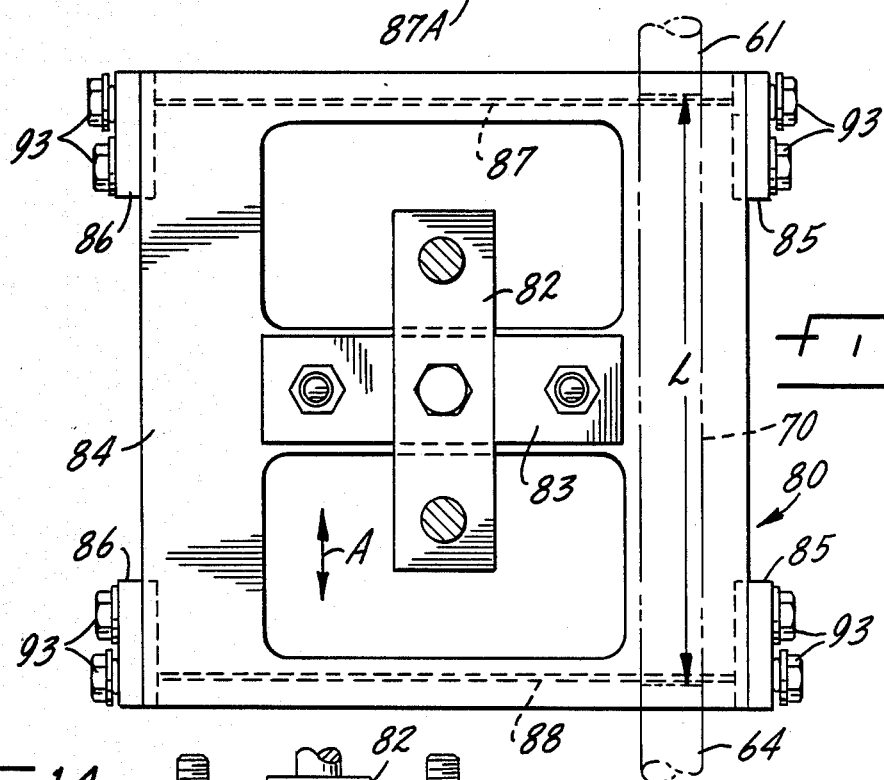
FIG. 13 is a sectional plan view taken approximately as indicated by line 13—13 in FIG. 12.

FIGS. 12 and 13 illustrate a knockout mechanism 80 for conversion tooling 20, molding mechanism 21; the same knockout mechanism 80 is shown on a much smaller scale in FIG. 2. Most of knockout mechanism 80 is suspended from the lower, vertially reciprocally movable portion 81 of the knockout apparatus for a conventional reciprocating mold plate patty molding machine such as the machine of U.S. Pat. No. 4,768,260. The drive mechanism and the means for synchronizing that mechanism with the mold plate drive are not shown because they may be conventional.

Knockout mechanism 80 includes an upper adapter bar mounted on the vertically reciprocally movable knockout head 81. A lower adapter bar 83 is in turn mounted upon adapter bar 82 and is used to suspend a main support bar 84 above the knockout station of the machine. There are four wire blocks affixed to the main support bar 84; two wire blocks 85 are mounted on one side of the main support bar and two wire blocks 86 are affixed to the other side of the support bar. The wire blocks 85 and 86 support two knockout or discharge wires 87 and 88 that extend across discharge mechanism 80 transversely to mold path A. The spacing between wires 87 and 88 is approximately equal to the spacing L between opposed ends of mold rods 61 and 64 (FIG. 13); in practice, the spacing between wires 87 and 88 should be made very slightly smaller than the spacing L.

Knockout mechanism 80 may also include a stationary radiant heater 89. Such a heater is a conventional feature of knockout mechanisms as used in known patty molding machines. Its principal purpose is to avoid accumulation of fatty deposits in the knockout mechanism. A shield 91 may also be provided for knockout mechanism 80. The knockout mechanism may also include a water spray 92 (FIG. 2) to preclude unwanted accumulations of food material in this portion of the food product molding mechanism.

During most of each cycle of operation of conversion tooling 20 (molding mechanism 21) support bar 84 of knockout mechanism 80 remains in the elevated position shown in FIG. 2 and shown in solid lines in FIG. 12. However, when mold rod assembly 50 reaches the discharge position shown in FIG. 1, and illustrated in phantom lines in the right-hand portion of FIG. 2, the knockout mechanism is actuated to drive head 81 downwardly, moving members 82–84 to the positions shown by phantom outlines 82A–84A in FIG. 12. This downward movement drives wire blocks 85 and 86 to positions 85A and 86A and also drives wires 87 and 88 down to the level indicated by wire 87A in FIG. 12. In the course of this downward movement, the two wires traverse the faces of mold rods 61 and 64 between which the molded food product is suspended and thus drop that product onto takeaway conveyor 71, see FIG. 2. The knockout cycle itself is quite short and the apparatus 80 is returned to the position shown in full lines in FIG. 12 quickly so that molding mechanism 21 can be returned to its fill position to form a new set of food products.

As shown in FIG. 2, each wire block 85 is mounted on the main support bar 84 by a pair of screws 93. The same construction is used on the opposite side of knockout mechanism 80 in mounting the other wire blocks 86. Support bar 84 is provided with additional tapped holes 94 to receive screws 93 so that the position of the forwardmost wire support block 85 can be adjusted to other positions in adapting conversion tooling 20 (molding mechanism 21) for the production of molded food products having varying lengths L. As shown, five different lengths can be accommodated by molding mechanism 80.

Figure 14:
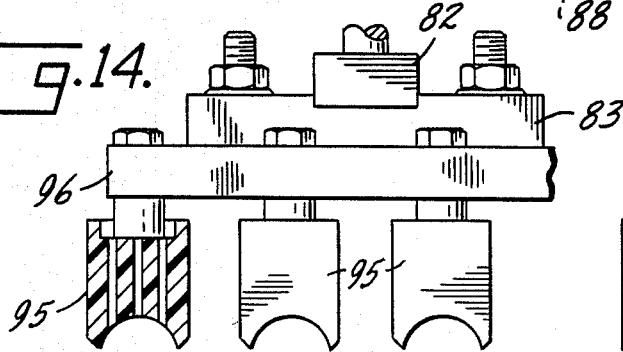
FIG. 14 is a detail end view, like a portion of FIG. 12, of a modification of the knockout mechanism.
Figure 15:
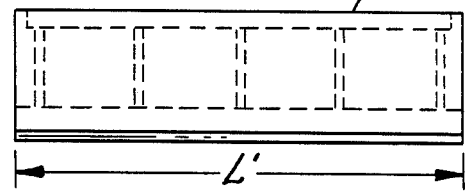
FIG. 15 is a side elevation view of a knockout shoe used in FIG. 14.

Other forms of knockout apparatus may be utilized in the molding mechanisms of the invention. Thus, referring to FIGS. 14 and 15, the rod-shaped molded food products may be discharged from the molding mechanism by elongated molded plastic cups 95, mounted on a support bar 96 which replaces the main support bar 84 of the previously described mechanism. For this arrangement, the length L' (FIG. 15) of each knockout cup 95 may be made slightly smaller than the product length L, or a combination of cups disposed end-to-end may be made to satisfy this condition. A knockout mechanism of this kind does permit simultaneous production of food products of different lengths L, which cannot be done with the wire discharge device 80.

I claim:

1. A food product molding mechanism for molding rod-shaped food products, comprising:
    food pump means for pumping a moldable food material under pressure into one end of a fill passage;
    a mold tube assembly mounted in alignment with the other end of the fill passage, the mold tube assembly including a plurality of N elongated mold tubes each of given length, each mold tube aligned parallel to a predetermined mold path and each mold tube having a fill opening aligned with the fill passage;
    a mold rod assembly comprising:
    a front drawbar;
    a rear drawbar;
    guide means, interconnecting the drawbars, for maintaining the drawbars in fixed spaced relation to each other adjacent opposite ends of the mold tube assembly, with each drawbar extending across the mold path;
    a set of N front mold rods, mounted on the front drawbar, each projecting toward the mold tube assembly parallel to the mold path and in alignment with one of the mold tubes;
    a set of N rear mold rods, mounted on the rear drawbar, each projecting toward the mold tube assembly parallel to the mold path and into one of the mold tubes;
    the ends of the front and rear mold rods aligned with each mold tube being spaced from each other by a predetermined distance L less than the length of that mold tube; and
    drive means, connected to the mold rod assembly, for cyclically reciprocally driving the mold rod assembly along the mold path between a fill position, in which food material flows from the fill passage into each mold tube between the spaced ends of the mold rods to form a rod-shaped food product of length L in each mold tube, and a discharge position, in which the ends of both sets of mold rods are clear of the front ends of the mold tubes and each rear mold rod fills the interior of its associated mold tube.

2. A food product molding mechanism according to claim 1 in which each rear mold rod projects a predetermined distance beyond its associated mold tube whenever the mold rod assembly is in its discharge position.

3. A food product molding mechanism according to claim 1 in which the front end of each mold tube has an outwardly facing surface normal to the axis of the mold.

4. A food product molding mechanism according to claim 1 in which each mold rod in one set of the mold rods is axially adjustable, parallel to the mold path, to adjust the lengths L of the rod-shaped food products molded in the associated mold tubes.

5. A food product molding mechanism according to claim 4 in which the adjustable set of mold rods is the front set of mold rods.

6. A food product molding mechanism according to claim 1, in which the mold tube assembly includes a manifold housing for all of the N mold tubes and in which each mold tube is removably mounted in the manifold housing to facilitate changeover from one product diameter to another.

7. A food product molding mechanism according to claim 6 in which each front mold rod is axially adjustable, parallel to the mold path, to adjust the length L of the rod-shaped food product molded in its associated mold tube.

8. A food product molding mechanism according to claim 6 in which:
    each mold tube includes a multiplicity of breather vents distributed axially and radially of the medial portion of the tube; and
    the manifold housing includes N individual breather passages each communicating with a substantial length of the medial portion of one mold tube.

9. A food product molding mechanism according to claim 8 in which the manifold housing further includes a breather collector passage communicating with all of the N individual breather passages.

10. A food product molding mechanism according to claim 8 in which each front mold rod is axially adjustable, parallel to the mold path, to adjust the length L of the rod-shaped food products molded in its associated mold tube.

11. A food product molding mechanism according to claim 10 in which each rear mold rod projects a predetermined distance beyond its associated mold tube whenever the mold rod assembly is in its discharge position.

12. A food product molding mechanism according to claim 6 in which the guide means comprises:
    two elongated guide apertures extending through the manifold housing parallel to the mold path; and
    two elongated guide rods, each extending through one of the guide apertures,
    each drawbar being mounted on one end of both guide rods.

13. A food product molding mechanism according to claim 12 and including further guide means which comprises:
    two guide members mounted in fixed positions on opposite sides of the manifold housing, each guide member having an elongated secondary guide aperture extending therethrough parallel to the mold path;
    two elongated secondary guide rods, each extending through one of the secondary guide apertures,
    and a drive yoke, mounted on and spanning corresponding ends of the secondary guide rods, the drive yoke also being connected to one of the drawbars and to the drive means.

14. A food product molding mechanism according to claim 1 and further comprising:
    knockout means, aligned with the discharge position of the mold rod assembly, for dislodging the molded food products from between the ends of the mold rods when the mold rod assembly is in its discharge position.

15. Conversion tooling for converting a reciprocal mold plate food patty molding machine to production of rod-shaped food products such as sausages, the food patty molding machine including:

a food pump for pumping a moldable food material under pressure into a fill passage at a molding station;

drive means for cyclically reciprocally driving a mold plate along a mold path, between a fill position at which a mold cavity in the mold plate is aligned with the fill passage to receive food material and form a food patty, and a discharge position in which the mold cavity is clear of the fill passage;

and a knockout mechanism, aligned with the discharge position, actuated in synchronism with the drive means;

the conversion tooling comprising:

a mold tube assembly mountable in the food patty molding machine in alignment with the fill passage, the mold tube assembly including a plurality of N elongated mold tubes each of given length, each mold tube aligned parallel to the mold path and each mold tube having a fill opening aligned with the fill passage;

and a mold rod assembly comprising:

a front drawbar;

a rear drawbar;

guide means, interconnecting the drawbars, for maintaining the drawbars in fixed spaced relation to each other adjacent opposite ends of the mold tube assembly, with each drawbar extending across the mold path;

a set of N front mold rods, mounted on the front drawbar, each projecting toward the mold tube assembly parallel to the mold path and in alignment with one of the mold tubes;

a set of N rear mold rods, mounted on the rear drawbar, each projecting toward the mold tube assembly parallel to the mold path and into one of the mold tubes;

the ends of the front and rear mold rods aligned with each mold tube being spaced from each other by a predetermined distance L less than the length of that mold tube; and connection means for connecting the mold rod assembly to the drive means so that the drive means cyclically reciprocally drives the mold rod assembly along the mold path between a fill position, in which food material flows from the fill passage into each mold tube between the spaced ends of the mold rods to form a rod-shaped food product of length L in each mold tube, and a discharge position, in which the ends of both sets of mold rods are clear of the front end of the mold tubes and each rear mold rod fills the interior of its associated mold tube.

16. Conversion tooling for converting a food patty molding machine to production of rod-shaped food products, according to claim 15, in which each rear mold rod projects a predetermined distance beyond its associated mold tube whenever the mold rod assembly is in its discharge position.

17. Conversion tooling for converting a food patty molding machine to production of rod-shaped food products, according to claim 15, in which each mold rod in one of the sets is axially adjustable, parallel to the mold path, to adjust the lengths L of the rod-shaped food products molded in the associated mold tubes.

18. Conversion tooling for converting a food patty molding machine to production of rod-shaped food products, according to claim 17, in which the adjustable set of mold rods is the front set of mold rods.

19. Conversion tooling for converting a food patty molding machine to production of rod-shaped food products, according to claim 15, in which the mold tube assembly includes a manifold housing for all of the N mold tubes and in which each mold tube is removably mounted in the manifold housing to facilitate changeover from one product diameter to another.

20. Conversion tooling for converting a food patty molding machine to production of rod-shaped food products, according to claim 19, in which each front mold rod is axially adjustable, parallel to the mold path, to adjust the length L of the rod-shaped food product molded in its associated mold tube.

21. Conversion tooling for converting a food patty molding machine to production of rod-shaped food products, according to claim 19 in which:

each mold tube includes a multiplicity of breather vents distributed axially and radially of the medial portion of the tube; and the manifold housing includes N individual breather passages each communicating with a substantial length of the medial portion of one mold tube.

22. Conversion tooling for converting a food patty molding machine to production of rod-shaped food products, according to claim 21, in which the manifold housing further includes a breather collector passage communicating with all of the N individual breather passages.

23. Conversion tooling for converting a food patty molding machine to production of rod-shaped food products, according to claim 22, in which each front mold rod is axially adjustable, parallel to the mold path, to adjust the length of the rod-shaped food products molded in its associated mold tube.

24. Conversion tooling for converting a food patty molding machine to production of rod-shaped food products, according to claim 23, in which each rear mold rod projects a predetermined distance beyond its associated mold tube whenever the mold rod assembly is in its discharge position.

25. Conversion tooling for converting a food patty molding machine to production of rod-shaped food products, according to claim 19, in which the guide means comprises:

two elongated guide apertures extending through the manifold housing parallel to the mold path; and two elongated guide rods, each extending through one of the guide apertures, each drawbar being mounted on one end of both guide rods.

26. Conversion tooling for converting a food patty molding machine to production of rod-shaped food products, according to claim 25, and including further guide means which comprises:

two guide members mounted in fixed positions on opposite sides of the manifold housing, each guide member having an elongated secondary guide aperture extending therethrough parallel to the mold path;

two elongated secondary guide rods, each extending through one of the secondary guide apertures, and a drive yoke, mounted on and spanning corresponding ends of the secondary guide rods, the drive yoke also being connected to one of the drawbars and to the drive means.

27. Conversion tooling for converting a food patty molding machine to production of rod-shaped food products, according to claim 15, and further comprising:

knockout means, aligned with the discharge position of the mold rod assembly, for dislodging the molded food products from between the ends of the mold rods when the mold rod assembly is in its discharge position.

* * * * *